(12) United States Patent
Sako et al.

(10) Patent No.: US 11,740,848 B2
(45) Date of Patent: Aug. 29, 2023

(54) STORAGE MEDIUM, COMPUTER, AND METHOD RELATED TO APPLICATION FOR PROVIDING PRINT SETTING SCREEN

(71) Applicant: CANON KABUSHIKI KAISHA, Tokyo (JP)

(72) Inventors: Ritsuto Sako, Tokyo (JP); Kazushige Shimada, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/539,981

(22) Filed: Dec. 1, 2021

(65) Prior Publication Data
US 2022/0179603 A1 Jun. 9, 2022

(30) Foreign Application Priority Data

Dec. 3, 2020 (JP) .................................. 2020-201255
Jun. 30, 2021 (JP) .................................. 2021-108999
Sep. 7, 2021 (JP) .................................. 2021-145183

(51) Int. Cl.
*G06F 3/12* (2006.01)
*G06F 3/04817* (2022.01)

(52) U.S. Cl.
CPC ........ *G06F 3/1276* (2013.01); *G06F 3/04817* (2013.01); *G06F 3/1205* (2013.01); *G06F 3/1225* (2013.01); *G06F 3/1253* (2013.01); *G06F 3/1288* (2013.01)

(58) Field of Classification Search
None
See application file for complete search history.

(56) References Cited

U.S. PATENT DOCUMENTS

2010/0265528 A1 10/2010 Kawano
2012/0002222 A1 1/2012 Ohara

FOREIGN PATENT DOCUMENTS

| JP | 2004310154 A | 11/2004 |
|---|---|---|
| JP | 2010250582 A | 11/2010 |
| JP | 2012014634 A | 1/2012 |
| JP | 2013037489 A | 2/2013 |
| JP | 2020087297 A | 6/2020 |

OTHER PUBLICATIONS

IPP Shared Infrastructure Extensions (INFRA); The Printer Working Group; (URL:https://ftp.pwg.org/pub/pwg/candidates/cs-ippinfra10-20150619-5100.18.pdf); Jun. 19, 2015; pp. 27-28.

*Primary Examiner* — Lennin R Rodriguezgonzalez
(74) *Attorney, Agent, or Firm* — Canon U.S.A., Inc. IP Division

(57) ABSTRACT

There is provided an application that acquires data of an icon from an external apparatus. Some embodiments provide a non-transitory storage medium storing an application that provides a print setting screen for allowing a user to make a print setting used to generate a print command provided for printing in a printer by a driver in a computer, wherein the application, when executed by the computer, causes the computer to acquire data of an icon representing the printer from an external apparatus different from the computer via a network, and display the acquired icon on a display unit of the computer.

21 Claims, 19 Drawing Sheets

FIG.2
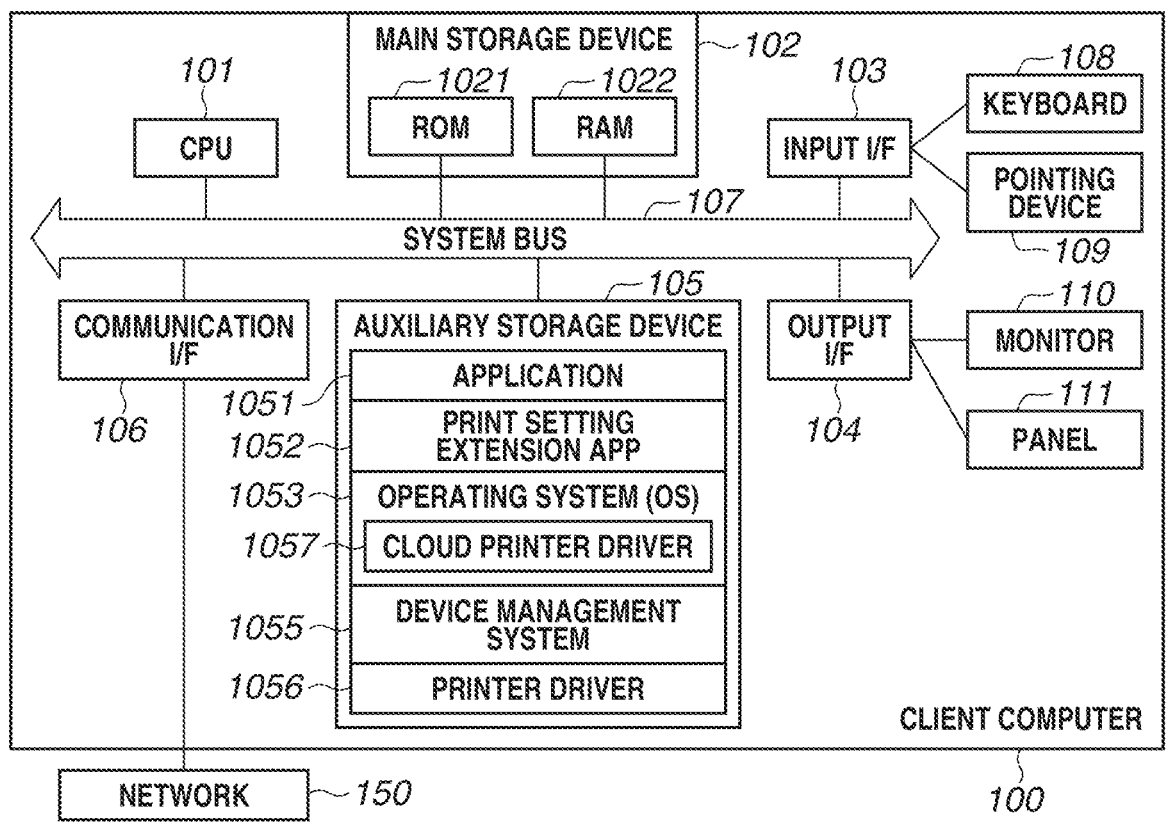
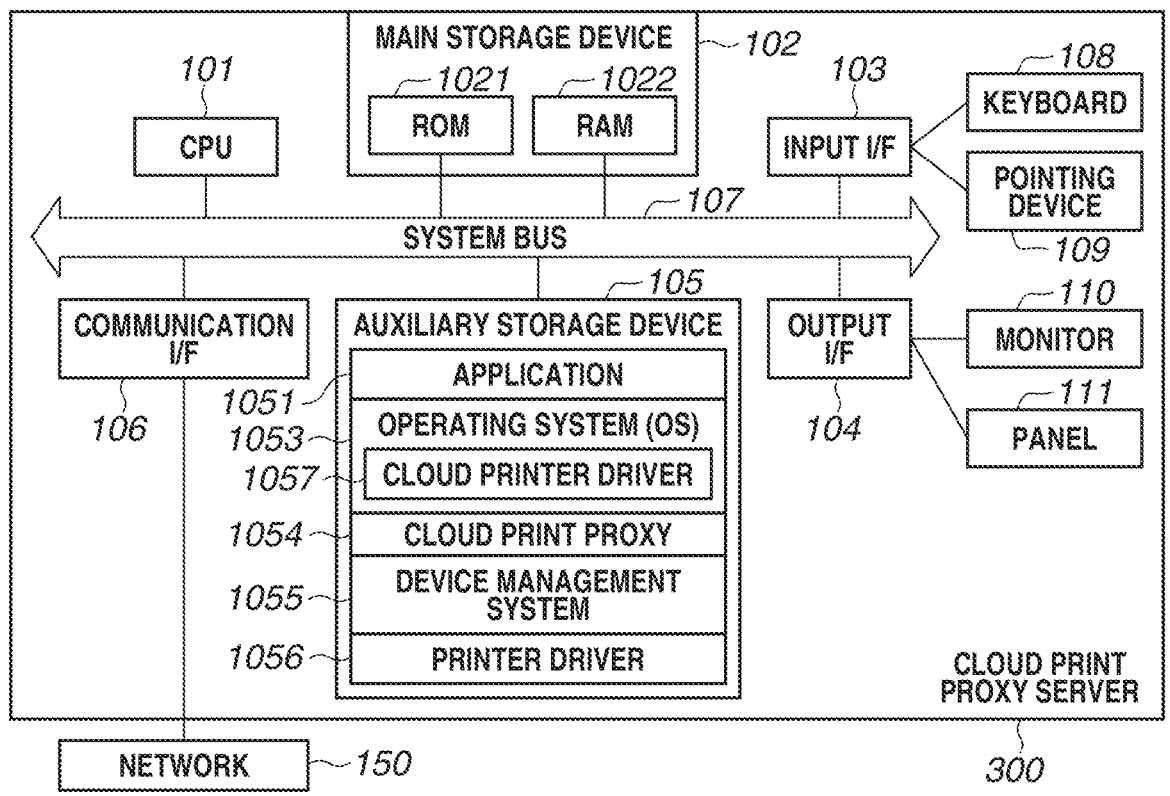

FIG.7
| PRINTER NAME | HWID | ICON |
|---|---|---|
| iR-ADV CCCC | iR-ADV_CCCC61B1 | 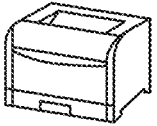 |
| iR-ADV XXXX | iR-ADV_XXXXD80D | 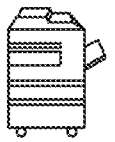 |
| AAAA | AAAACF39 |  |
| YYYY | YYYY62B5 | 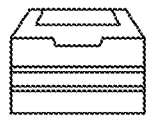 |

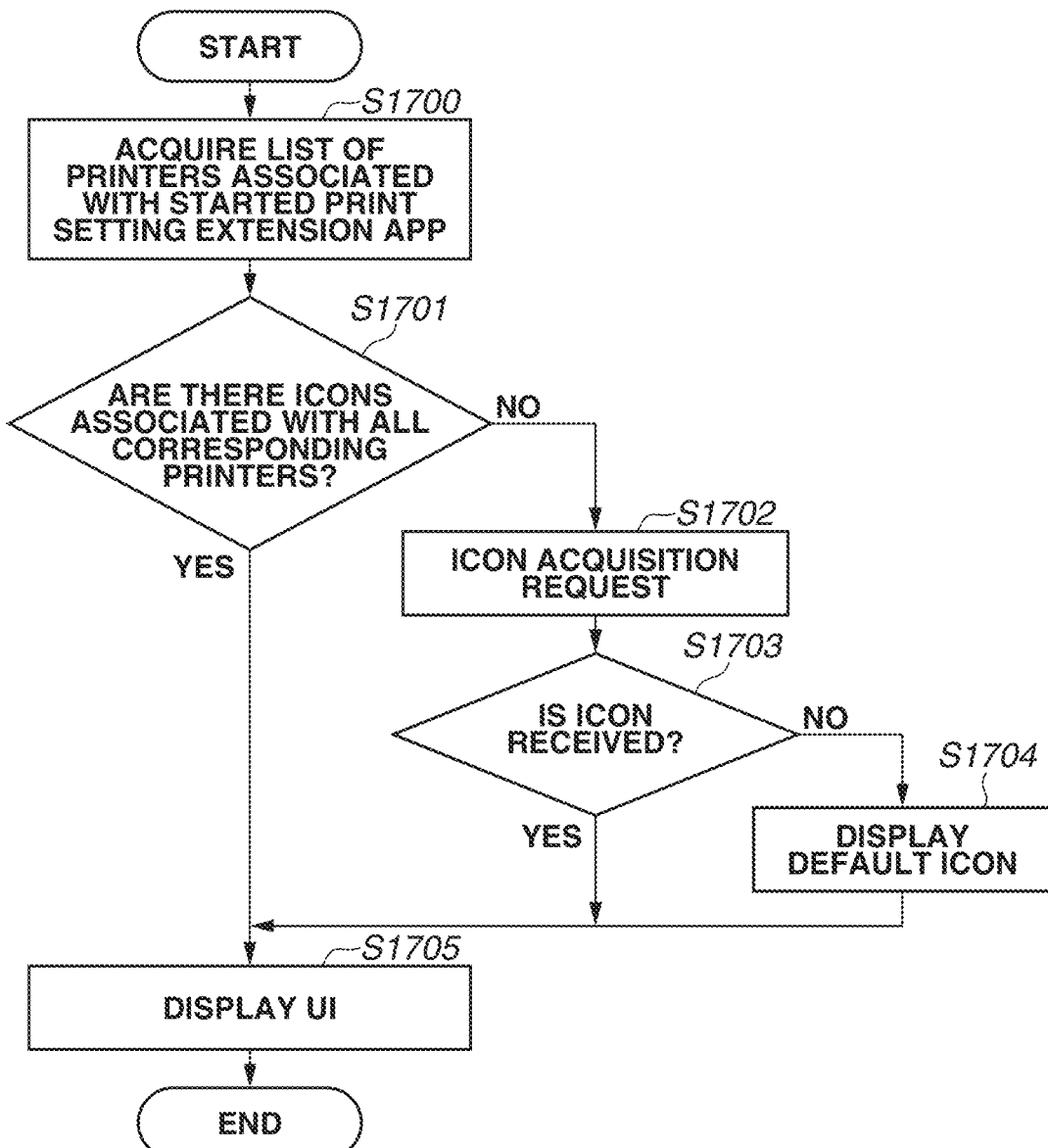

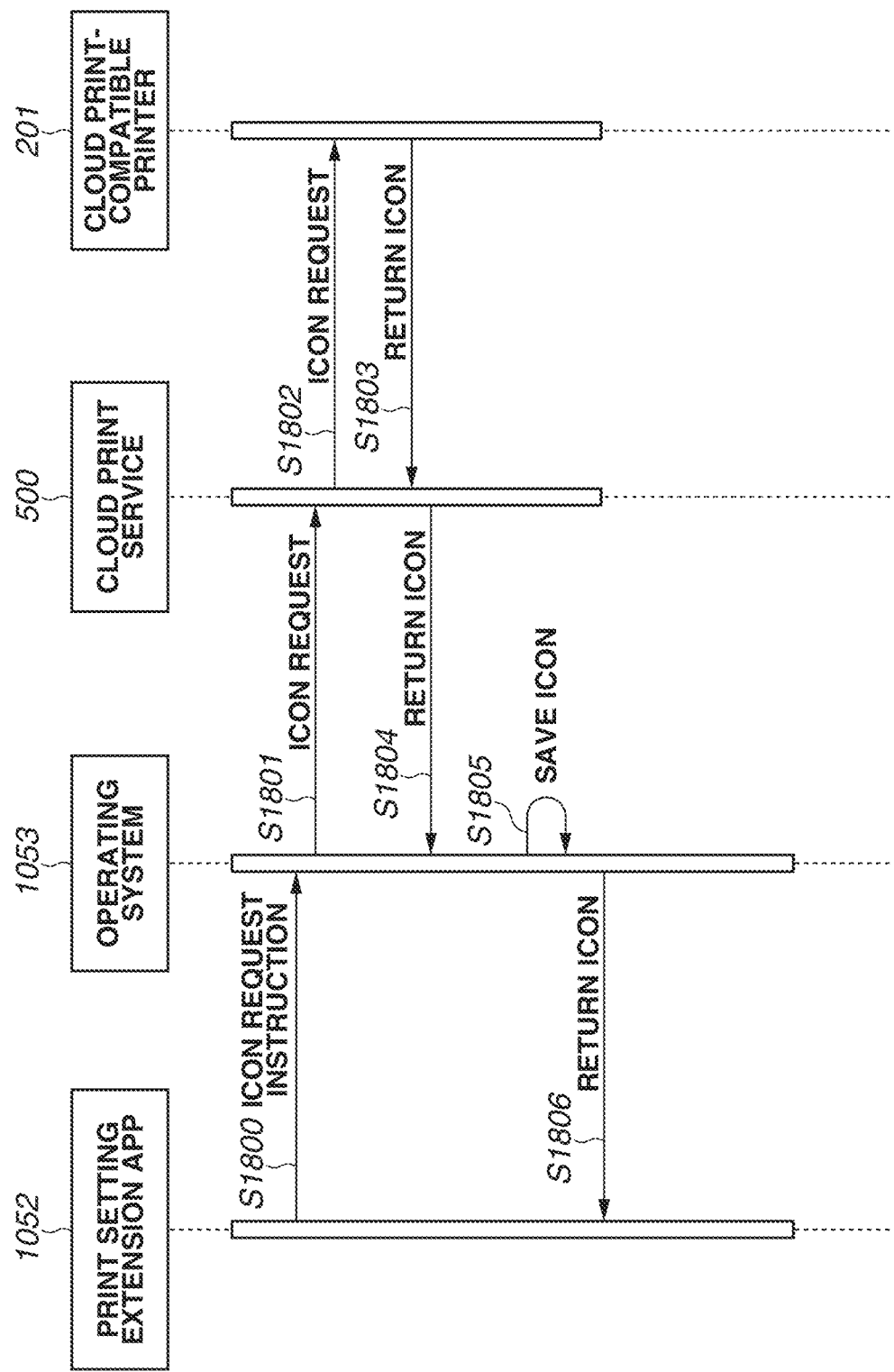

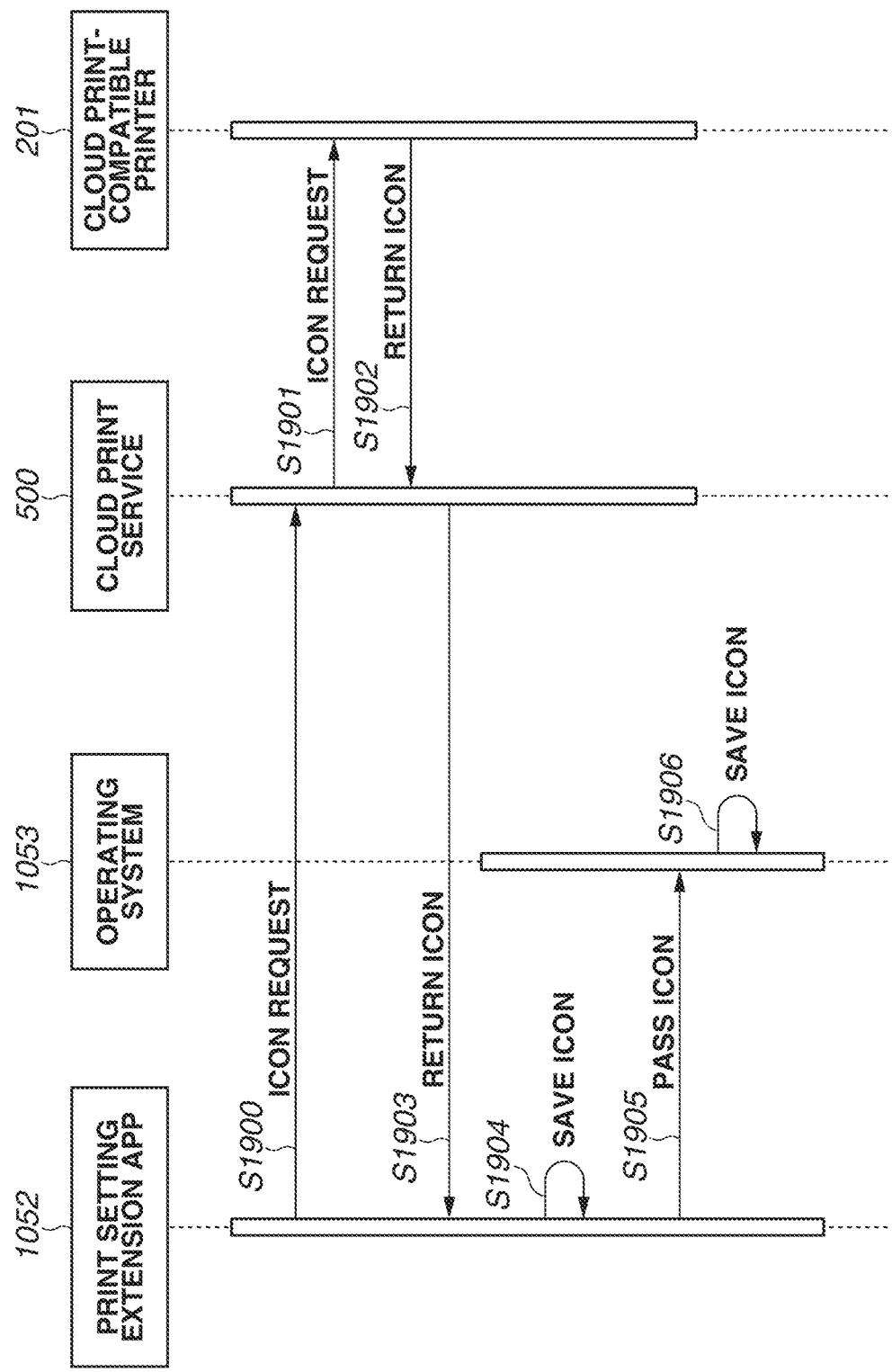

STORAGE MEDIUM, COMPUTER, AND METHOD RELATED TO APPLICATION FOR PROVIDING PRINT SETTING SCREEN

BACKGROUND

Field of the Disclosure

The present disclosure relates to an application for providing a print setting screen for a standard driver useable for any model.

Description of the Related Art

Conventionally, printing is performed by a driver provided by a printer vendor (a printer manufacturer). In recent years, an environment has been created where printing can be performed without installing a driver provided by a printer vendor. This is because an operating system (OS) vendor provides a standard driver. For example, on Windows®, a standard driver termed Internet Printing Protocol (IPP) Class Driver is mounted. On Android®, a standard driver termed Mopria® is mounted. On iOS®, a standard driver termed AirPrint® is mounted as a function of an OS. Each of these standard drivers is a driver that outputs a print command compatible with a printing protocol termed the IPP. Thus, a printer that supports the IPP can receive such a print command and execute printing. Such a standard driver is characterized by causing printers of a plurality of models of a plurality of printer vendors supporting a printing protocol to execute printing. In short, such a standard driver is characterized by supporting printers of a plurality of models.

In Japanese Patent Application Laid-Open No. 2004-310154, in an information processing apparatus capable of communicating with a printer, a driver installed on the information processing apparatus acquires icon image data representing the external appearance of the printer from the printer (see FIG. 7). Then, the driver provides the icon image data to an OS.

In this way, the OS displays the icon on a printer management screen (e.g., screens of the device and the printer) provided by the OS (see FIG. 2).

SUMMARY

Embodiments of the present disclosure provide a non-transitory storage medium storing an application that provides a print setting screen for allowing a user to make a print setting used to generate a print command provided for printing in a printer by a driver in a computer, wherein the application, when executed by the computer, causes the computer to acquire data of an icon representing the printer from an external apparatus different from the computer via a network, and display the acquired icon on a display unit of the computer.

Further features of the present disclosure will become apparent from the following description of exemplary embodiments with reference to the attached drawings.

BRIEF DESCRIPTION OF THE DRAWINGS

FIG. 2 is a block diagram illustrating hardware configurations of a client computer and a cloud print proxy server.

FIG. 7 is a table illustrating an example of an icon saving method of the cloud print service.

FIG. 17 is a flowchart illustrating a process of acquiring an icon.

FIG. 18 is a sequence diagram performed when an instruction to acquire an icon is given.

FIG. 19 is a sequence diagram performed when an icon request is directly made to a cloud print service.

DESCRIPTION OF THE EMBODIMENTS

With reference to the drawings, exemplary embodiments of the present disclosure will be described.

Figure 1:
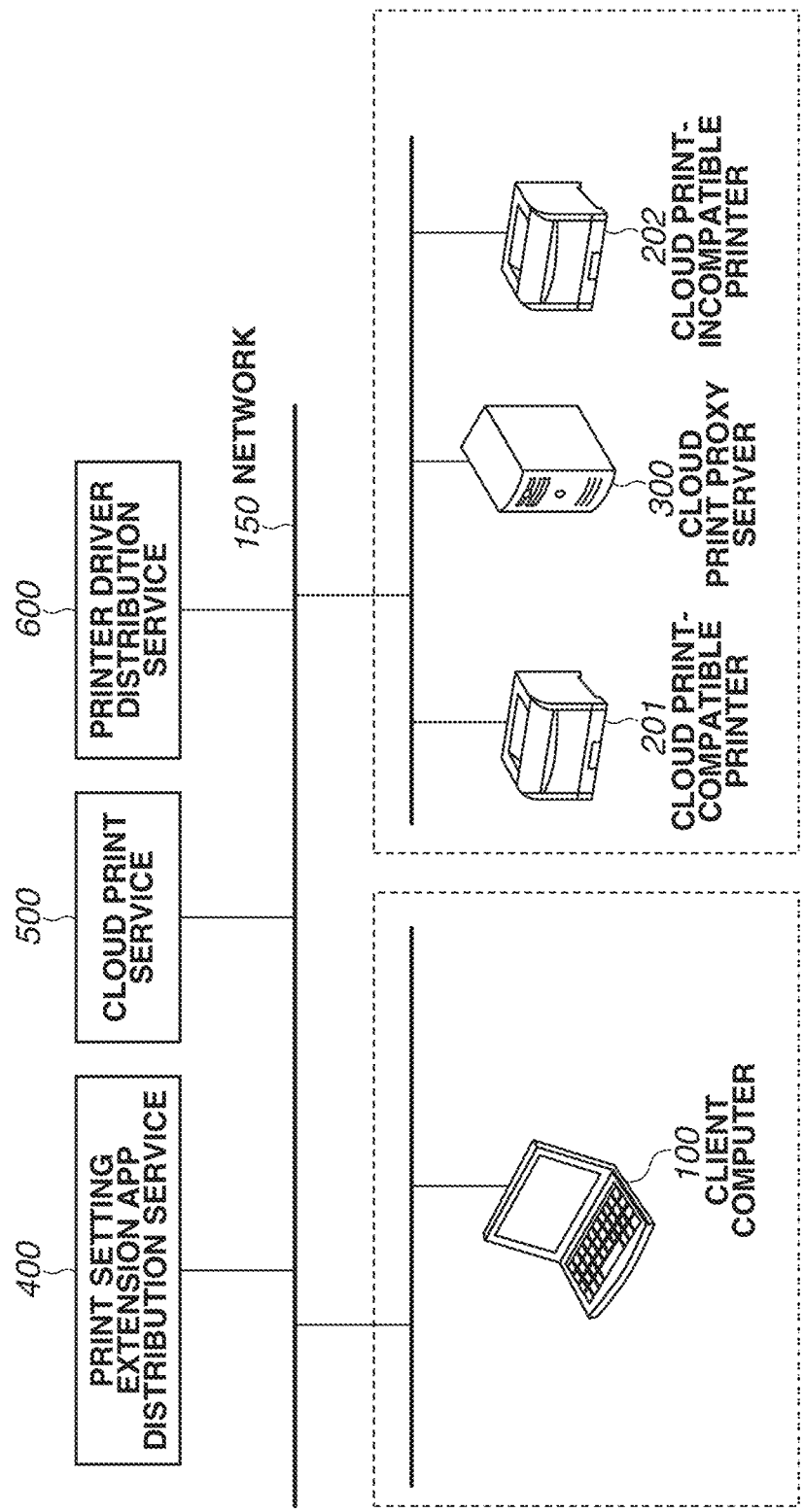
FIG. 1 is a block diagram illustrating a network configuration.

FIG. 1 is a network configuration diagram illustrating an environment of a network 150 according to a first exemplary embodiment in a simplified manner. A client computer 100 is connected to the network 150 to be capable of communicate with other devices. A cloud print-compatible printer 201, a cloud print-incompatible printer 202, and a cloud print proxy server 300 are connected to an intranet different from that of the client computer 100 and connected to the client computer 100 via the Internet. To the network 150, a printer driver distribution service 600, a print setting extension application (hereinafter, referred to as app) distribution service 400, and a cloud print service 500 are connected.

The printer driver distribution service 600 executes a service for distributing a printer driver to the client computer 100 on a web-base. The client computer 100 searches for a printer using a protocol such as the Web Services for Devices (WSD) protocol or the Internet Printing Protocol (IPP), acquires a printer driver corresponding to identification information regarding a found printer from the printer driver distribution service 600, and installs the printer driver. If a version of the printer driver newer than that of the printer driver installed on the client computer 100 is uploaded on the printer driver distribution service 600, the client computer 100 automatically or manually acquires the newer printer driver from the printer driver distribution service 600 and updates the installed printer driver.

The print setting extension app distribution service 400 is a server that executes a service for distributing an application to be executed by the client computer 100. If the client computer 100 receives a user operation for requesting the client computer 100 to install a print setting extension app, or if the identifier of an application is described in an information file (hereinafter, an "Inf file") of a printer driver, the client computer 100 acquires a corresponding print setting extension app from the print setting extension app distribution service 400 and installs the corresponding print setting extension app.

The cloud print service 500 is a service for print control on the Internet constructed on a cloud that is a server system composed of a plurality of servers (i.e., on the server system). In the present exemplary embodiment, the cloud print service 500 can connect to each intranet and directly connect to the client computer 100 and the cloud print-compatible printer 201 via the Internet. On the other hand, the cloud print service 500 can connect to the cloud print-incompatible printer 202 via the cloud print proxy server 300.

The cloud print service 500 manages an account using a user identification (ID) and a password, and a user can access the cloud print service 500 using this account.

The cloud print proxy server 300 is a computer which has a hardware configuration similar to that of the client computer 100 and on which a cloud print proxy 1054 is installed. The cloud print-incompatible printer 202 can connect to the cloud print service 500 via the cloud print proxy server 300. Consequently, the cloud print-incompatible printer 202 can be registered in the cloud print service 500 and also provide an output even if the cloud print-incompatible printer 202 is incompatible with the cloud print.

FIG. 2 is a hardware configuration diagram illustrating internal configurations of the client computer 100 and the cloud print proxy server 300.

In FIG. 2, a central processing unit (CPU) 101 included in the client computer 100 controls the entire apparatus according to a program stored in a read-only memory (ROM) 1021 or a random-access memory (RAM) 1022 of a main storage device 102 or an auxiliary storage device 105.

The RAM 1022 is also used as a work area when the CPU 101 performs various processes. The auxiliary storage device 105 stores an operating system (OS) 1053 including a cloud printer driver 1057, an application 1051, a print setting extension app 1052, a device management system 1055, and a printer driver 1056. In the following description, the main storage device 102 and the auxiliary storage device 105 will be collectively referred to as a "storage device".

Input devices such as a pointing device 109 typified by a mouse and a touch panel, and a keyboard 108 are devices connected to the client computer 100 via an input interface (I/F) 103 and for the user to give various instructions to the client computer 100.

An output I/F 104 is an interface for outputting data to outside and outputs data to output devices such as a monitor 110 and a panel 111.

The client computer 100 is connected to a printer 200 (in exemplary embodiments of the present disclosure, if it does not matter whether a printer supports cloud print, the printer is collectively referred to as the "printer 200") and systems via a communication I/F 106 and the network 150. Data is exchanged between I/Fs and modules via a common data system bus 107. In addition, processing according to the present exemplary embodiment is achieved by the CPU 101 executing processing based on a program stored in the storage device.

In the present exemplary embodiment, two drivers, i.e., the cloud printer driver 1057 and an IPP standard driver, are assumed as standard drivers included in the operating system 1053.

The cloud printer driver 1057 is a printer control program capable of giving a print instruction to any printer connected to the cloud print service 500, regardless of the model of the printer. The IPP standard driver is a printer control program capable of giving a print instruction to a printer connected to the cloud print service 500 using the IPP protocol, regardless of the model of the printer.

The application 1051 is a general business application such as a general application capable of editing a document or creating a presentation material. As the application 1051, an application to which a print instruction can be given by operating a user interface (UI) such as a menu is assumed.

The print setting extension app 1052 is application software that operates cooperatively with a standard printer driver such as the cloud printer driver 1057 included in the operating system 1053 to make detailed print settings specific to a printing target printer. The print setting extension app 1052 may store a group of icons for corresponding printers. An icon for a printer (i.e., the icon of the printer) is created, for example, for each model of the printer. The icon for the printer can also be said to be visual information (a figure or an illustration) representing the printer.

The device management system 1055 is a program downloaded from the printer driver distribution service 600 similarly to the printer driver 1056 and for managing various pieces of information regarding the cloud print-incompatible printer 202 as an output target. Further, the device management system 1055 holds an icon corresponding to the output target printer as information other than the above pieces of information.

The printer driver 1056 is a model-specific printer control program provided by a printer vendor and is assumed to be obtained from the printer driver distribution service 600. The printer driver 1056 can make device-specific detailed print settings by itself.

On the other hand, the cloud print proxy server 300 is different from the client computer 100 only in applications stored in the auxiliary storage device 105. More specifically, a cloud print proxy 1054 is stored instead of the print setting extension app 1052. The cloud print proxy 1054 is a program for converting various communication procedures to provide the cloud print service 500 to the cloud print-incompatible printer 202.

In the cloud print proxy server 300, functional modules other than the above functional module are similar to those of the client computer 100, and therefore are not described.

The cloud print proxy server 300 may be integrated with the client computer 100. In this case, the auxiliary storage device 105 stores all of the print setting extension app 1052, the cloud printer driver 1057, the cloud print proxy 1054, the device management system 155, and the printer driver 1056.

Figure 3:
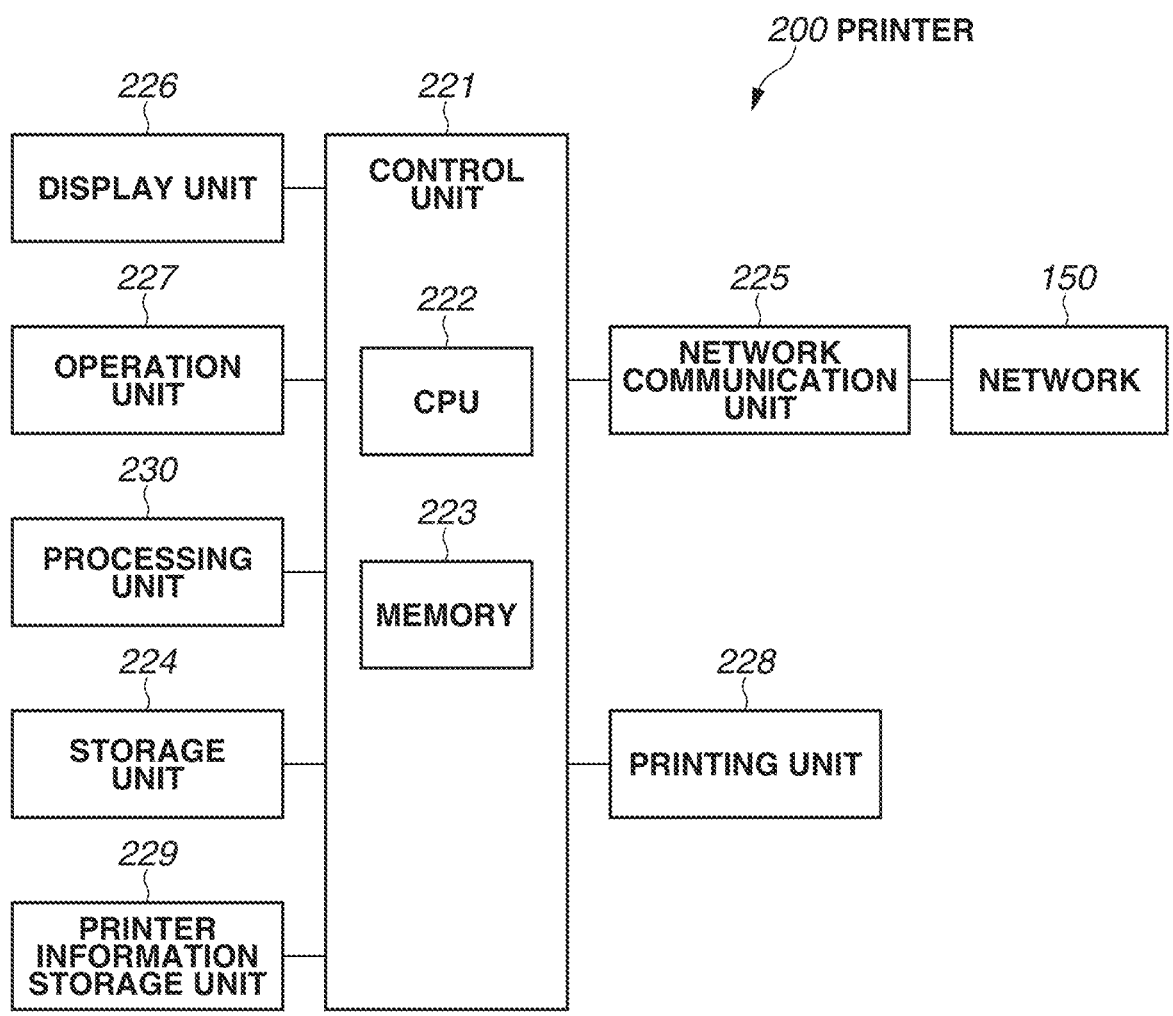
FIG. 3 is a block diagram illustrating functions of a printer.

FIG. 3 is a block diagram illustrating functional blocks of the printer 200, which is an example of an image processing apparatus according to the present exemplary embodiment. The configuration of the printer 200 also applies to the cloud print-compatible printer 201 and the cloud print-incompatible printer 202.

A control unit 221 including a CPU 222 controls the operation of the entire printer 200. The CPU 222 reads a control program stored in a memory 223 or a storage unit 224 and performs various types of control such as print control and reading control. The memory 223 is used as a work area or a temporary storage area into which various control programs are loaded. The storage unit 224 stores print data, image data, various programs, and various pieces of setting information. In the present exemplary embodiment, as the storage unit 224, an auxiliary storage device such as a hard disk drive (HDD) is assumed. Alternatively, a non-volatile memory such as a solid-state drive (SSD) may be used instead of the HDD. Pieces of hardware such as the CPU 222, the memory 223, and the storage unit 224 compose a so-called computer in this way.

A processing unit 230 has a function of a raster image processor (RIP) that rasterizes print data received via the network 150, thereby generating image data. The processing unit 230 has an ability of an image processing unit and can also perform a resolution conversion process and a correction process on an image. The present exemplary embodiment assumes that the image processing unit is achieved by a hardware circuit (an application-specific integrated circuit (ASIC) or a field-programmable gate array (FPGA)). However, it is not limited to this. Alternatively, for example, the printer 200 may include a processor for image processing, and the processor for image processing may execute an image processing program, thereby achieving image processing and a rasterization process on print data. Further, a configuration can also be employed in which the CPU 222 executes a program for performing image processing, thereby performing image processing and a rasterization process on print data. Alternatively, image processing may be performed based on the combination of any of these methods.

An operation unit 227 includes a liquid crystal display unit having a touch panel function, and various hardware keys. The operation unit 227 functions as a display unit 226 that displays information and a reception unit that receives an instruction from the user, or functions as a reading unit that reads a document, thereby generating a read image. The generated read image is stored in the storage unit 224. A print image generated by the processing unit 230 by analyzing print data is transferred from the control unit 221 to a printing unit 228. Then, the printing unit 228 receives a control command and the print image via the control unit 221, and based on the image, prints the image on a sheet fed from a sheet feeding cassette (not illustrated).

The control unit 221 is connected to the network 150 via a network communication unit 225. The network communication unit 225 transmits an image and information to a communication apparatus on the network 150 or receives print data and information from a communication apparatus on the network 150.

A printer information storage unit 229 stores hardware ID (hereinafter, "HWID") that is an identifier for uniquely distinguishing the printer 200, ability information, and an icon. The printer information storage unit 229 may exist in the storage unit 224.

Figure 4:
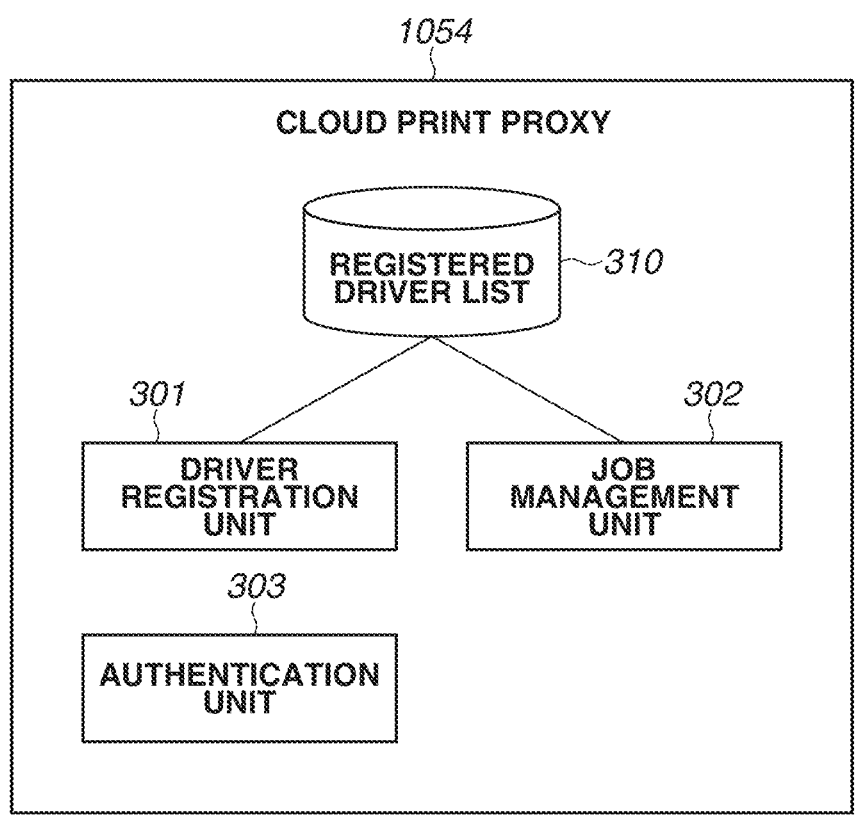
FIG. 4 is a block diagram illustrating function units of a cloud print proxy.

FIG. 4 is a functional block diagram of the cloud print proxy 1054 according to the present exemplary embodiment.

The cloud print proxy 1054 is an application having a conversion function for enabling the use of the cloud print-incompatible printer 202 in the cloud print service 500. In the present exemplary embodiment, the cloud print proxy 1054 has functions of a driver registration unit 301, a job management unit 302, an authentication unit 303, and a registered driver list 310. The driver registration unit 301 lists printer drivers 1056 registered in advance in the cloud print proxy server 300, receives a selection by the user, registers a corresponding printer driver 1056 in the cloud print service 500, and if the registration is successful, registers the corresponding printer driver 1056 in the registered driver list 310.

The job management unit 302 receives a print job from the cloud print service 500 and directly sends the print job to the cloud print-compatible printer 201 depending on the situation.

The authentication unit 303 manages credential information such as a user ID and a password for the cloud print service 500 used by the user. This function may exist in the cloud print service 500, which authenticates the credential information.

Figure 5:
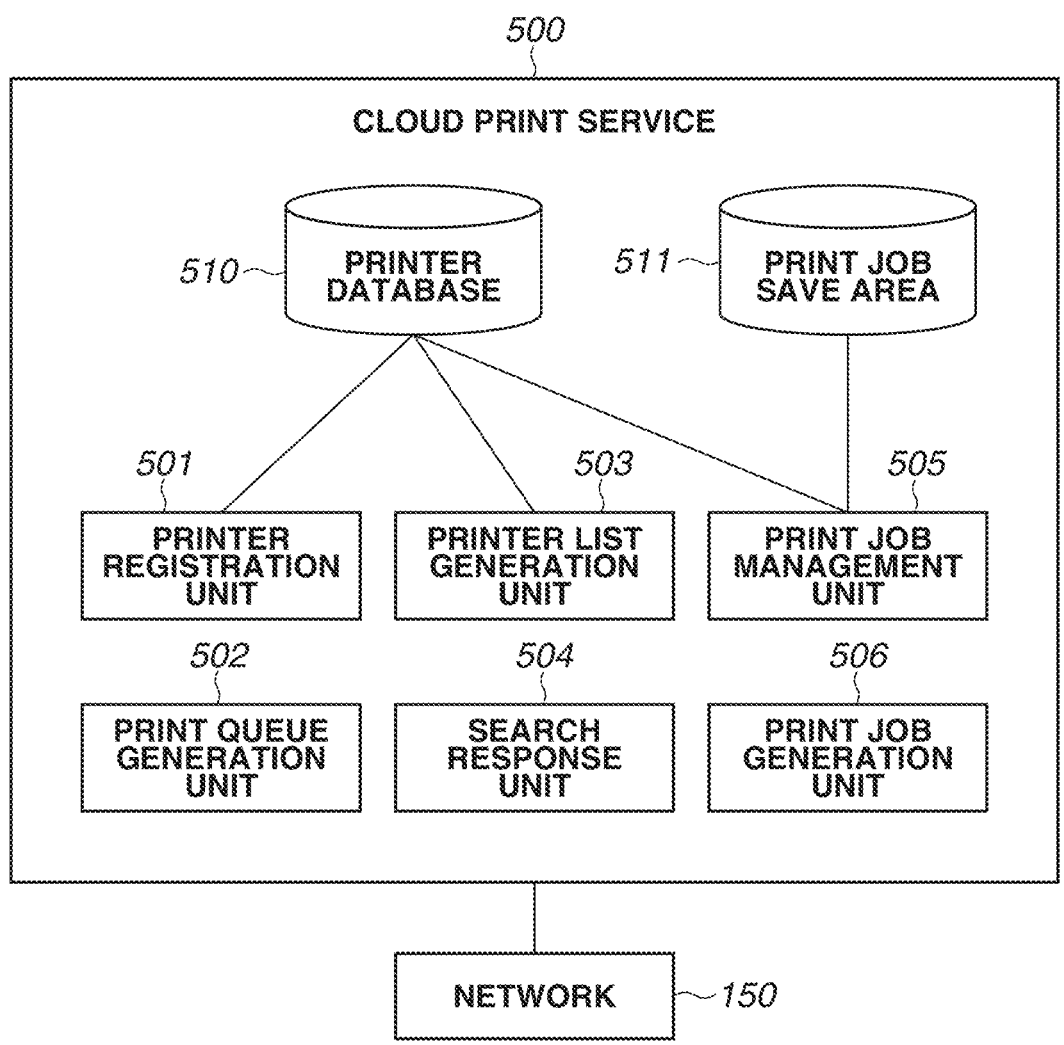
FIG. 5 is a block diagram illustrating function units of a cloud print service.

FIG. 5 is a functional block diagram illustrating the cloud print service 500 according to the present exemplary embodiment.

The cloud print service 500 is a service existing on the cloud via the Internet and can provide functions related to printing. In the present exemplary embodiment, the cloud print service 500 has functions of a printer registration unit 501, a print queue generation unit 502, a printer list generation unit 503, a search response unit 504, and a printer database 510. Further, the cloud print service 500 has functions of a print job management unit 505, a print job generation unit 506, and a print job save area 511. These functions may exist in another cloud print service that cooperates with the cloud print service 500.

If the printer registration unit 501 receives a printer registration instruction from the cloud print-compatible printer 201, the printer registration unit 501 uses the print queue generation unit 502 to generate a print queue, and registers the generated print queue in the printer database 510, in association with identification information regarding the printer. The printer database 510 also stores an icon of the printer. The cloud print-incompatible printer 202 needs to be registered by a registration operation using the cloud print proxy server 300. The state where the print queue of the printer and the identification information regarding the printer are thus registered in association with each other is described as "the printer is registered". Various attributes may be added to the printer registered at this time. For example, the location of the printer corresponds to one of the attributes.

The printer list generation unit 503 generates a list of registered printers.

The search response unit 504 returns information regarding registered printers in response to a printer search event performed on the cloud print service 500 by the client computer 100.

The print job management unit 505 receives a print job from the client computer 100 and directly sends the print job to the printer 200 depending on the situation. Alternatively, the print job management unit 505 temporarily saves the print job in the print job save area 511 and passes the print job to the print job generation unit 506 at a timing when an output destination printer is determined. Then, the print job generation unit 506 converts the print job into an appropriate format and sends the converted print job.

Figure 6:
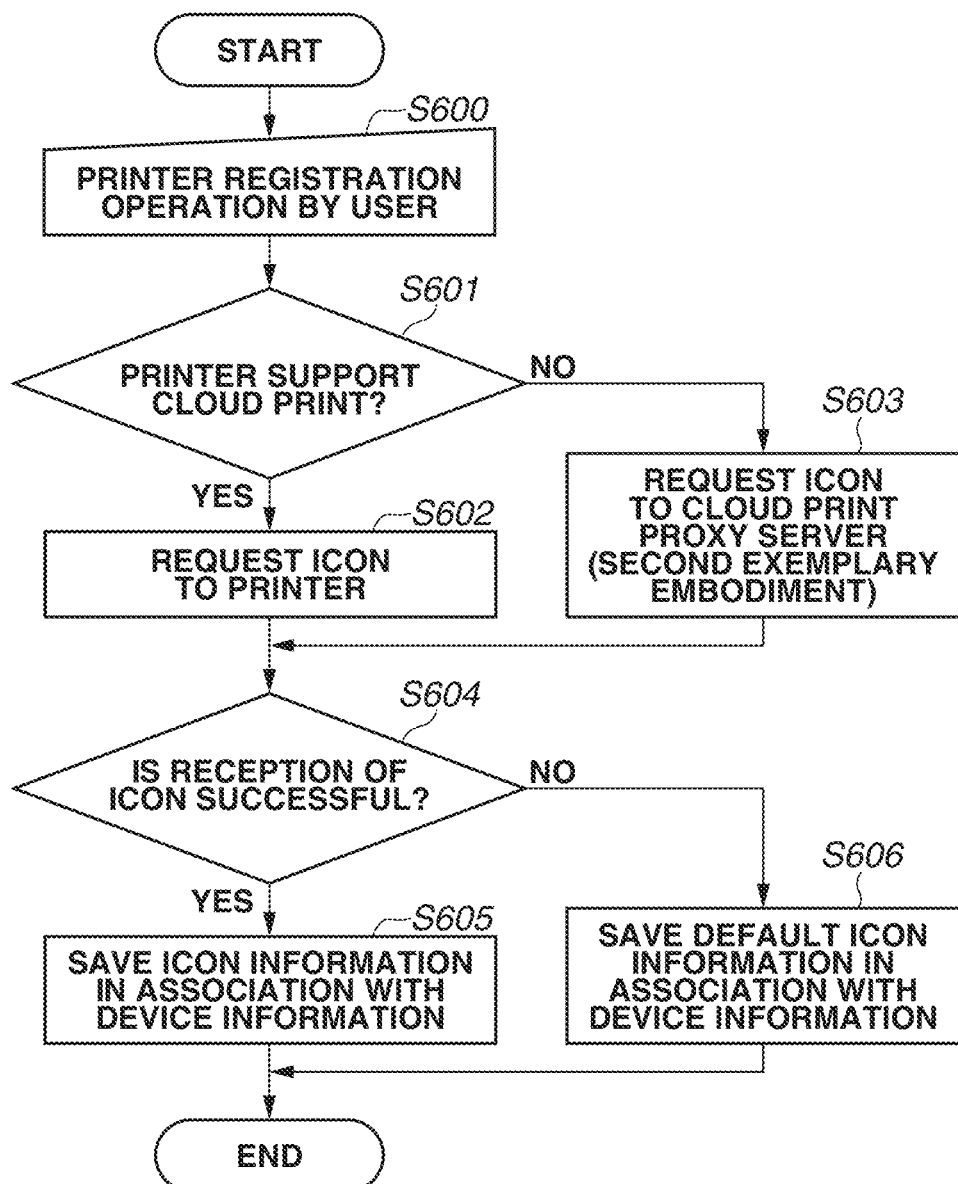
FIG. 6 is a flowchart illustrating an icon acquisition process performed by the cloud print service when the printer is registered in the cloud print service.

FIG. 6 is a flowchart illustrating a process in which the cloud print service 500 acquires an icon when a printer is registered in the cloud print service 500, according to the present exemplary embodiment. Thus, unless otherwise stated, the operation in this flowchart is performed by the cloud print service 500. In this flowchart, information regarding an icon that can be acquired is included in a printer.

In step S600, this flowchart starts when the user selects a printer and registers the printer in the cloud print service 500. If the printer to be registered is the cloud print-compatible printer 201, the user can also perform this registration operation through a web UI according to the present exemplary embodiment (not illustrated) included in the cloud print-compatible printer 201. In step S600, the cloud print service 500 receives a device registration operation performed by the user. In step S601, the cloud print service 500 determines whether the printer is a printer compatible with cloud print. If it is determined that the printer is the cloud print-compatible printer 201 (YES in step S601), the processing proceeds to step S602. In step S602, the cloud print service 500 makes an icon acquisition request to the cloud print-compatible printer 201 as the registration target in step S600.

On the other hand, in step S601, if it is determined that the printer is not directly connected to the cloud print service 500 (NO in step S601), the processing proceeds to step S603. This case will be described below in a second exemplary embodiment (This case will be described as a different exemplary embodiment for ease of description. Steps S602 and S603, however, can be performed in the same product, and therefore are in the same exemplary embodiment.). In step S604, if the reception of the icon requested in step S602 or S603 is successful (YES in step S604), the processing proceeds to step S605. In step S605, the cloud print service 500 saves the received icon in association with identification information regarding the printer in the printer database 510. For example, as illustrated in FIG. 7, an icon is saved in association with an HWID with respect to each printer. On the other hand, in step S604, if the reception of the icon is not successful (NO in step S604), the cloud print service 500 saves an appropriate icon generalized for the model of the printer using the identification information regarding the printer in association with the identification information in the printer database 510.

Another Method A According to First Exemplary Embodiment

In step S602, the cloud print service 500 may not simply make an icon acquisition request, but may employ the following method. Specifically, the printer 201 sends in advance a request for Uniform Resource Locator (URL) information indicating the storage location of the icon to the cloud print service 500. More specifically, in an operation "Get-Printer-Attributes" in the IPP, the printer 201 transmits a request to acquire information regarding an attribute "printer-static-resource-directory-uri" to the cloud print service 500. Then, in step S602, the cloud print service 500 responds to the request. More specifically, the cloud print service 500 makes this response by sending URL information indicating the storage location of the icon to the printer 201. Further, in detail, when the cloud print service 500 responds to the operation "Get-Printer-Attributes" in the IPP, the cloud print service 500 sets URL information in the attribute "printer-static-resource-directory-uri" and transmits to the printer 201 the attribute with the URL information set therein. Then, the printer 201 sends the icon to a URL indicated by the URL information and saves the icon at the storage location. More specifically, the printer 201 transmits the icon to the URL using the PUT method in the Hypertext Transfer Protocol (HTTP). Based on another method A, in step S604, the cloud print service 500 does not check whether the reception of the icon is successful, but checks whether the icon is saved at the storage location.

Then, if the icon is saved at the storage location (YES in step S604), the processing proceeds to step S605. In step S605, the cloud print service 500 saves the URL information and device information (the identification information regarding the printer) in association with each other.

<Yet Another Method B>

The exemplary embodiment described with reference to FIG. 6 has a configuration in which the printer 201 transmits icon data to the cloud print service 500. Alternatively, a configuration may be employed in which the printer 201 does not transmit the icon data itself, but the printer 201 notifies the cloud print service 500 of information (URL information) regarding the location where the icon data is stored. This configuration is based on the premise that a server that stores in advance the icon data exists on the cloud, and the printer 201 holds URL information regarding the icon data. In this case, the icon is acquired in step S602 by the following procedure. The printer 201 transmits URL information indicating the storage location of the icon to the cloud print service 500. More specifically, in an operation "Set-Printer-Attributes" in the IPP, the printer 201 sets URL information in an attribute "printer-static-resource-directory-uri". Then, the printer 201 transmits to the cloud print service 500 the attribute with the URL information set therein, thereby transmitting the URL information. In this case, "printer-static-resource-directory-uri" is the name of an IPP attribute that can store a Uniform Resource Identifier (URI) where static information regarding the printer, such as icon information, is stored. If the icon is not stored in advance at the URL, the printer 201 may transmit the icon information to the storage location of the icon by an operation PUT in the HTTP.

If the acquisition of the URL information is successful in step S604 (YES in step S604), the processing proceeds to step S605. In step S605, the cloud print service 500 saves the URL information indicating the storage location of the icon in association with device information.

Figure 8:
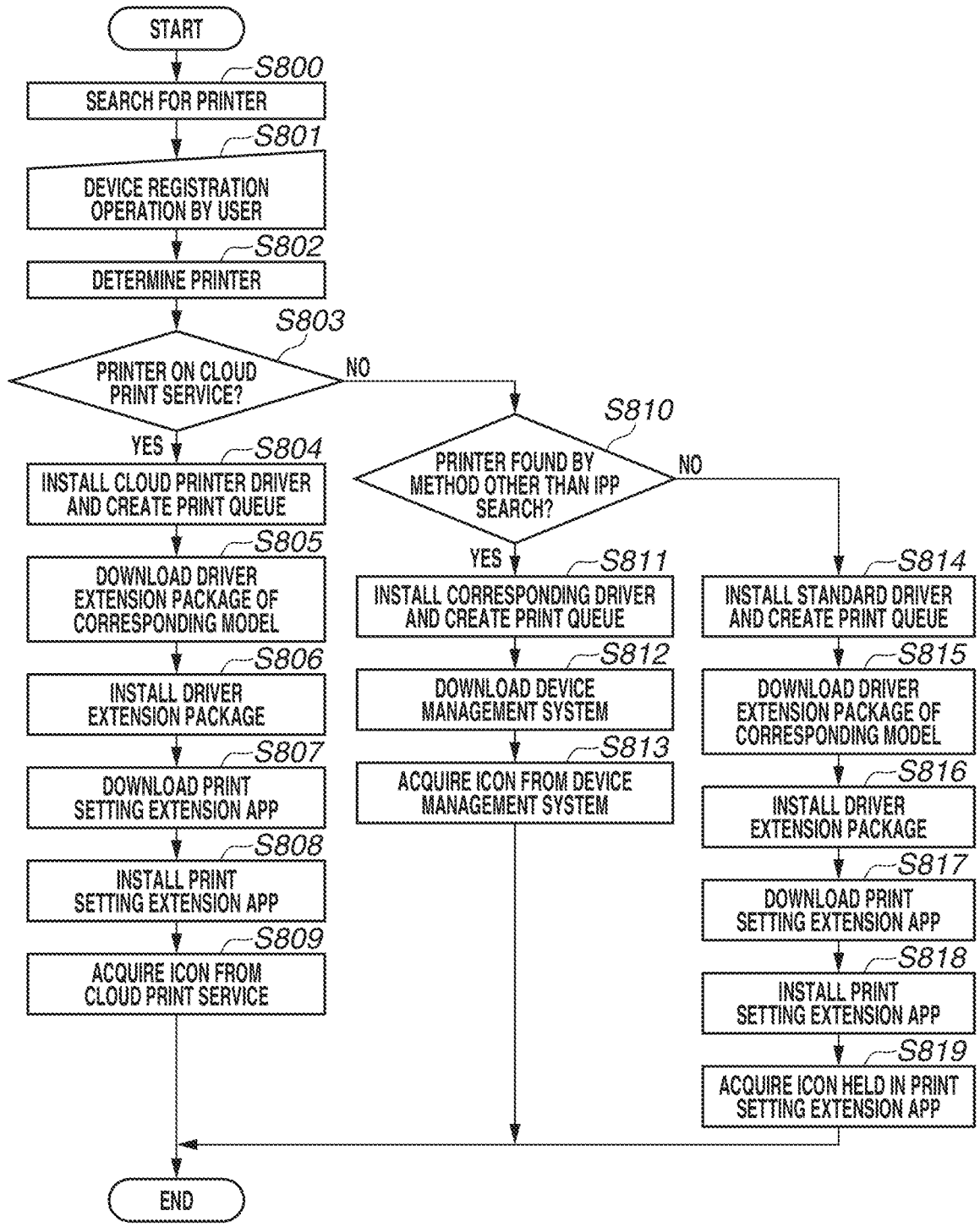
FIG. 8 is a flowchart illustrating an icon acquisition process performed when the printer is registered in the client computer.

FIG. 8 is a flowchart illustrating a process in which the operating system 1053 operating on the client computer 100 acquires an icon in the process of registering a printer. Steps are performed by the operating system 1053. This flowchart starts from the process in which the operating system 1053 searches for a printer in response to a printing operation performed through the application 1051 by the user. In step S800, the operating system 1053 searches for a printer using a protocol such as the WSD protocol or the IPP and lists (the names of) found printers. Further, in step S800, the operating system 1053 also detects a printer which is registered in the cloud print service 500 and from which the user is permitted to provide an output. In other words, even if the cloud print-compatible printer 201 and the cloud print-incompatible printer 202 are not on the same intranet as that of the client computer 100, but if the cloud print-compatible printer 201 and the cloud print-incompatible printer 202 are registered in the cloud print service 500, the cloud print-compatible printer 201 and the cloud print-incompatible printer 202 can be found by the printer search. The operating system 1053 saves detection flag information indicating whether the group of detected printers is detected by a WSD search, is detected by an IPP search, or is printers on the cloud print service 500.

Next, in step S801, the operating system 1053 receives a registration operation (selection operation) for registering (the name of) a printer selected by the user from the printers listed in step S800. In step S802, the operating system 1053 determines the printer with the selection being received in step S801. In step S803, the operating system 1053 determines whether the printer is a printer on the cloud print service 500 depending on the saved detection flag information regarding the printer selected in step S801. If the printer is a printer on the cloud print service 500 (YES in step S803), the processing proceeds to step S804.

In step S804, based on the detection flag information saved in step S800, the operating system 1053 identifies a driver to be installed as the cloud printer driver 1057. Then, the operating system 1053 installs the identified cloud printer driver 1057, creates a print queue (printer queue), and associates the installed cloud printer driver 1057 and the print queue with each other.

Next, in step S805, based on HWID that is information for identifying the printer, the operating system 1053 downloads a driver extension package from the printer driver distribution service 600.

The driver extension package is an example of a package distributed from the printer driver distribution service 600. The driver extension package is an information file that can be distributed from the printer driver distribution service 600, and includes HWID for identifying the printer, identifier information regarding the print setting extension app 1052, information indicating that this package is a driver extension package, and information such as the version of the driver extension package.

Then, in step S806, the operating system 1053 installs the driver extension package downloaded in step S805. Then, the operating system 1053 associates the installed driver extension package with the print queue.

Next, in step S807, based on the identifier information regarding the print setting extension app 1052 described in the driver extension package, the operating system 1053 searches for a print setting extension app 1052 in the print setting extension app distribution service 400. In other words, the operating system 1053 searches for a print setting extension app 1052 having the same identifier information as the identification information described in the driver extension package. Then, the operating system 1053 downloads a print setting extension app 1052 found by the search.

In the present exemplary embodiment, in the print setting extension app distribution service 400, the identifier information regarding the print setting extension app 1052 described in the driver extension package and the print setting extension app 1052 are associated with each other on a one-to-one basis. In other words, if a search is performed based on the identifier information described in the driver extension package, two or more print setting extension apps are not found, but only one print setting extension app is always found. The print setting extension app distribution service 400 may save association information (hereinafter, "metadata") regarding the identifier information regarding the print setting extension app 1052 and the HWID included in printer information. In this case, a mechanism for downloading an appropriate print setting extension app 1052 using the metadata is provided.

In step S808, the operating system 1053 installs the print setting extension app 1052 downloaded in step S807.

After the print setting extension app 1052 is installed, the operating system 1053 associates the print setting extension app 1052 with the print queue of the printer selected in step S801 on a one-to-one basis. Then, the print queue holds model information regarding the printer and print setting information, whereby the print setting extension app 1052 can acquire these pieces of information and construct and present an appropriate print setting UI corresponding to the acquired pieces of information. Alternatively, the print setting extension app 1052 may directly communicate with the cloud print service 500, acquire model information regarding a target and print setting information, and construct and provide a UI using the acquired pieces of information. In either case, if the installation of the print setting extension app 1052 is completed, the user can use changes in detailed print settings. An example of printing using the print setting extension app 1052 is described.

In a case where the user performs printing using a standard driver (the cloud printer driver 1057 or the IPP standard driver), the user gives a print instruction through the application 1051 of the client computer 100. As a specific example, the user presses "print" in a file menu of the application 1051.

Figure 9:
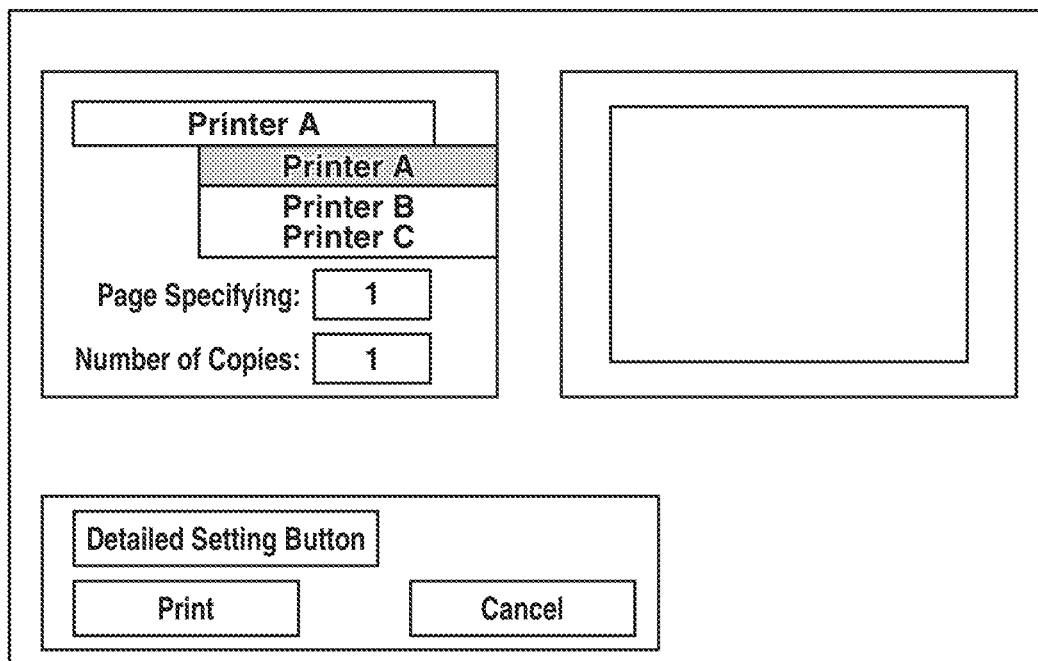
FIG. 9 is an example of a screen of a print common dialog.
Figure 10:
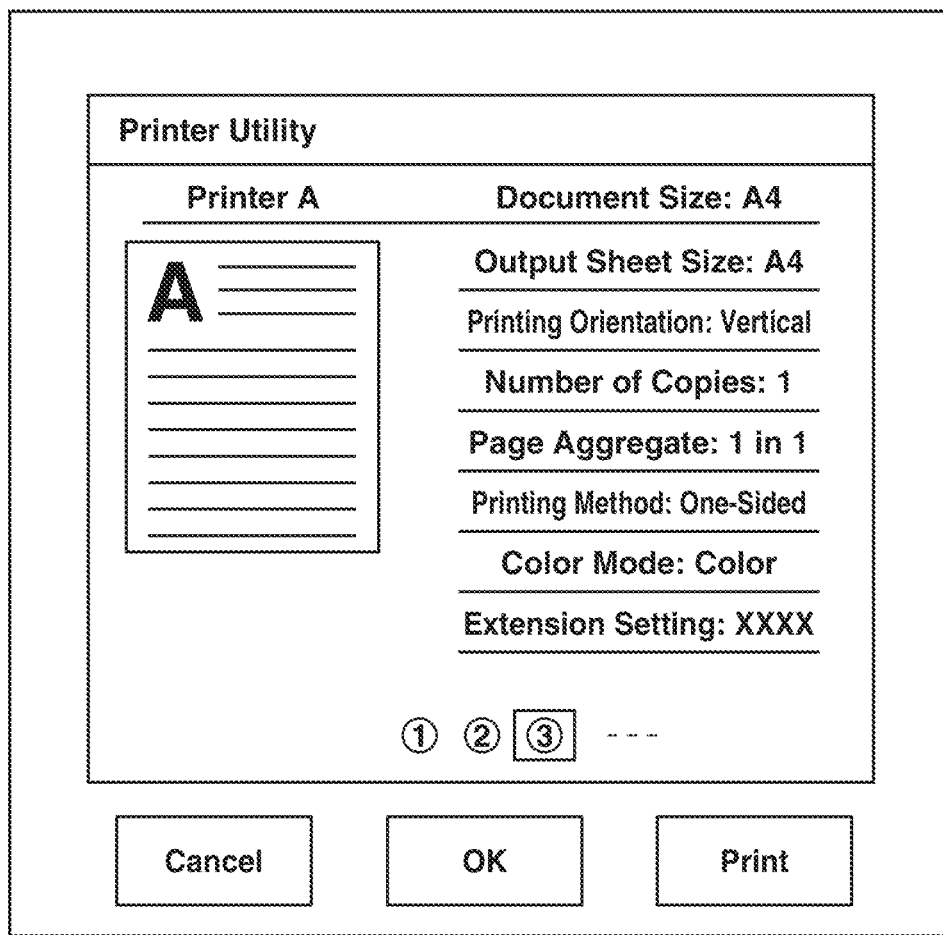
FIG. 10 is an example of a screen of detailed settings.

As an operation of a normal application, if the application 1051 receives a print instruction from the user, the application 1051 instructs the operating system 1053 to display a print common dialog illustrated in FIG. 9 (print setting screen provided by the operating system 1053). The operating system 1053 receives the instruction from the application 1051 and displays the print common dialog. The print common dialog displayed by the operating system 1053 can list printers installed on the client computer 100 and allows the specifying of pages to be printed and the setting of the number of copies. The user can select from the print common dialog a print queue of a printer from which the user wants to provide an output, press a detailed setting button (object) displayed on the same screen, and give a print setting change instruction to the print queue. At this time, the operating system 1053 starts a print setting extension app 1052 associated with the print queue and displays a print setting change UI illustrated in FIG. 10. For example, the user is allowed to make the settings of image processing, such as density and tint, set whether to combine a stamp, and set a punch position and a stapling position. If the user changes the print settings on the print setting UI and gives a print instruction, the operating system 1053 having received the instruction notifies a driver associated with the print queue of the contents of the print settings. In response, the driver transmits data to be printed to the printer or the cloud print service 500. More specifically, the data to be printed is transmitted to the printer in the case of the IPP standard driver and transmitted to the cloud print service 500 in the case of the cloud printer driver 1057.

In step S809, based on the HWID identifying the printer, the operating system 1053 makes an icon request to the cloud print service 500.

The cloud print service 500 having received the icon request transmits to the request source an icon that matches the received HWID among the icons saved as illustrated in FIG. 7. Then, the operating system 1053 associates the received icon with the print queue. The icon associated with the print queue is displayed as an icon representing the print queue on a printer management screen displayed by the operating system 1053.

In this flowchart, the operating system 1053 makes an icon acquisition request to the cloud print service 500. Alternatively, the print setting extension app 1052 may make an icon acquisition request. In this case, the print setting extension app 1052 provides an acquired icon to the operating system 1053. Alternatively, a configuration may be employed in which when the print setting extension app 1052 makes an acquisition request to the cloud print service 500, the print setting extension app 1052 makes the acquisition request in response to the request of the operating system 1053.

In the present exemplary embodiment, the cloud print service 500 acquires an icon from a printer in advance. Then, the operating system 1053 or the print setting extension app 1052 makes an icon acquisition request to the cloud print service 500. If, however, the operating system 1053 or the print setting extension app 1052 sends an icon acquisition request to the cloud print service 500, the cloud print service 500 having received the icon acquisition request may acquire an icon from a printer at the time of the reception. Alternatively, a form may be employed in which in the state before the print setting extension app 1052 is installed, the print setting extension app 1052 includes in advance an icon corresponding to each model of a printer supported by the print setting extension app 1052. In this case, the print setting extension app 1052 only needs to acquire an icon from an area included in the print setting extension app 1052 without taking the trouble of acquiring the icon from a printer or the cloud print service 500.

Continued from Another Method A According to First Exemplary Embodiment

In step S809, the icon request may be made by the following procedure. First, the operating system 1053 requests URL information indicating the storage location of the icon to the cloud print service 500. More specifically, the operating system 1053 transmits an operation "Get-Printer-Attributes" in the IPP to the cloud print service 500. At this time, the operating system 1053 sets an IPP attribute "printer-static-resource-directory-uri" as the argument of the operation. This requests the value of "printer-static-resource-directory-uri". The cloud print service 500 having received the request returns the value of "printer-static-resource-directory-uri" to the operating system 1053. In this value, URL information indicating the storage location of the icon (URL information previously received from the printer, or if the icon is moved to another location, URL information regarding another location) is stored. Thus, the URL information is transmitted to the operating system 1053. Then, the operating system 1053 transmits an icon request to a URL indicated by the acquired URL information. As a result, the icon is sent from the storage location, and the operating system 1053 receives the icon. Also in yet another method B, the same operation as that in another method A is performed in this step.

Figure 11:
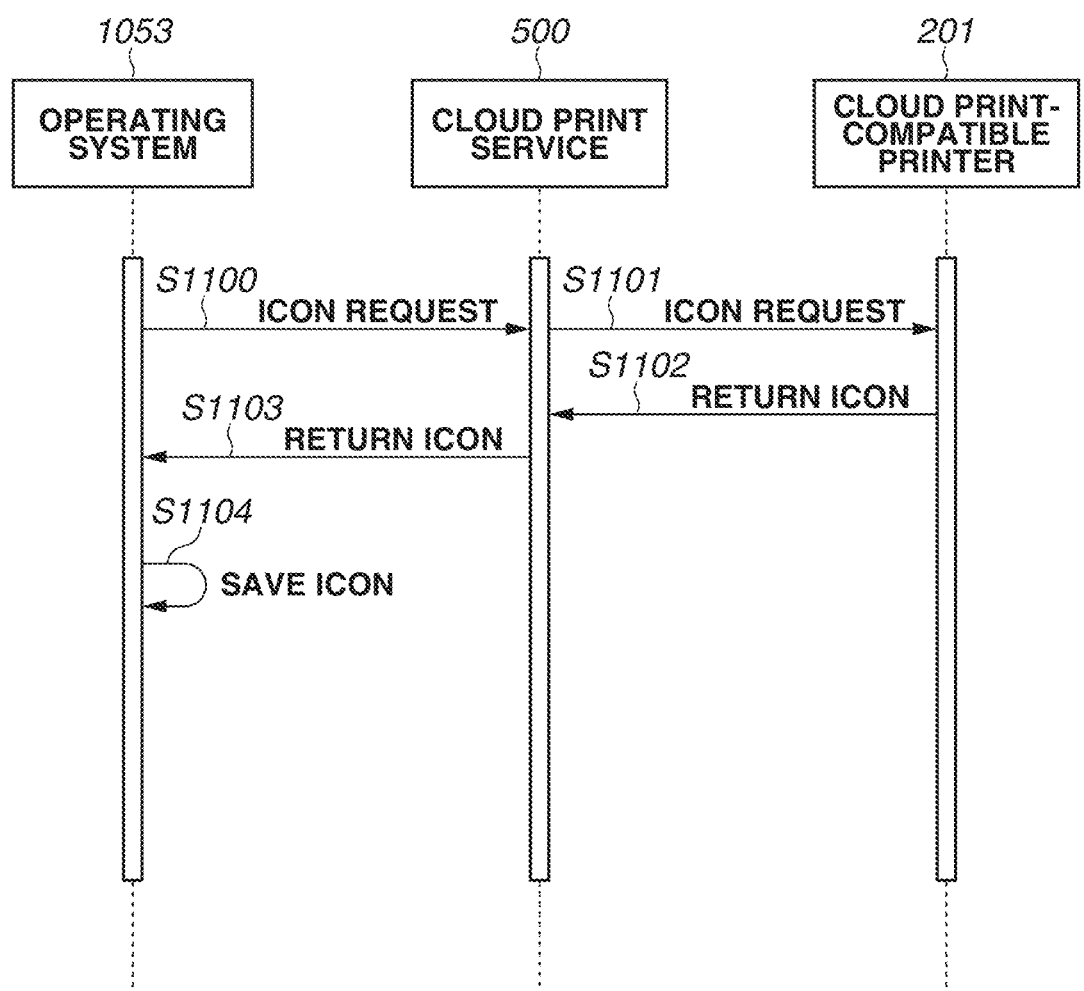
FIG. 11 is a sequence diagram illustrating a process in which the cloud print service acquires an icon based on an icon request from an operating system.

FIG. 11 is a sequence diagram illustrating a process in which the cloud print service 500 acquires an icon in response to an icon request from the operating system 1053. This sequence diagram illustrates an example of a sequence included in step S809 in FIG. 8.

In step S1100, this sequence diagram starts from the process in which the operating system 1053 makes an icon request to the cloud print-compatible printer 201 corresponding to a print queue associated with the cloud print service 500. As described above, the icon request may also be made by another method using URL information. In this case, similar to the above description, also in the returning of an icon in step S1103, the icon is acquired using URL information. Then, in step S1101, the cloud print service 500 having received the icon acquisition request sends an icon acquisition request to the cloud print-compatible printer 201 to which the request has been made. As described above, this icon acquisition request may also be made by another method using URL information. In this case, similar to the above description, also in the returning of an icon in step S1102, the icon is acquired using URL information.

Then, in step S1102, the cloud print-compatible printer 201 having received the icon acquisition request transmits an icon saved in the printer information storage unit 229 to the cloud print service 500 as the request source. In step S1103, the cloud print service 500 having received the icon transmitted in step S1102 transmits the icon to the operating system 1053 as the icon request source. Then, in step S1104, the operating system 1053 having received the icon associates the icon with the print queue.

In step S1103, the icon received by the cloud print service 500 may be saved in association with information regarding the printer as illustrated in FIG. 7, or may be temporarily saved.

In the present exemplary embodiment, a description has been given of a method for acquiring an icon from the cloud print service 500. Alternatively, based on HWID, the operating system 1053 may determine an appropriate icon from among a group of icons stored in the print setting extension app 1052 and acquires the icon. The operating system 1053 may also associate the icon with a print queue.

On the other hand, in step S803, if it is determined that the printer selected by the user performing the registration operation is not a printer on the cloud print service 500 based on the detection flag information created in step S800 (NO in step S803), the processing proceeds to step S810. In step S810, if the printer selected by the user in step S801 is a printer found by a method other than an IPP search based on the detection flag information created in step S800 (YES in step S810), the processing proceeds to step S811. In step S811, based on the detection flag information, the operating system 1053 downloads a corresponding driver from the printer driver distribution service 600 based on HWID, installs the corresponding driver, and creates a print queue. The HWID is used to determine the corresponding driver. Then, in step S812, the operating system 1053 downloads a device management system 1055 corresponding to the printer. In step S813, the operating system 1053 acquires an icon present in the device management system 1055 downloaded in step S812 and associates the icon with the created print queue.

On the other hand, in step S810, if it is determined that the printer selected by the user in step S801 is a printer found by an IPP search based on the detection flag information created in step S800 (NO in step S810), the processing proceeds to step S814. In step S814, the IPP standard driver defined by the operating system 1053 performs communication determined by a standard with the printer and generates a print queue on which required ability information is reflected.

In this way, the operating system 1053 installs the IPP standard driver having the function of enabling printers of a plurality of models of a plurality of printer vendors to execute printing. After the IPP standard driver is installed, the operating system 1053 connects to the printer via the print queue. Thus, the operating system 1053 is configured to send a print instruction to only a printer to which the operating system 1053 is connected. In step S814, a print queue associated with the installed IPP standard driver is created on the operating system 1053. The processes of steps S815 to S818 are similar to those of steps S805 to S808, and therefore are not described. In step S819, based on information such as HWID of the printer, the operating system 1053 selects an appropriate icon from among a group of icons stored in the print setting extension app 1052 installed in step S818 and acquires the icon. The operating system 1053 may associate the icon acquired at this time with the print queue created in step S814.

Figure 12:
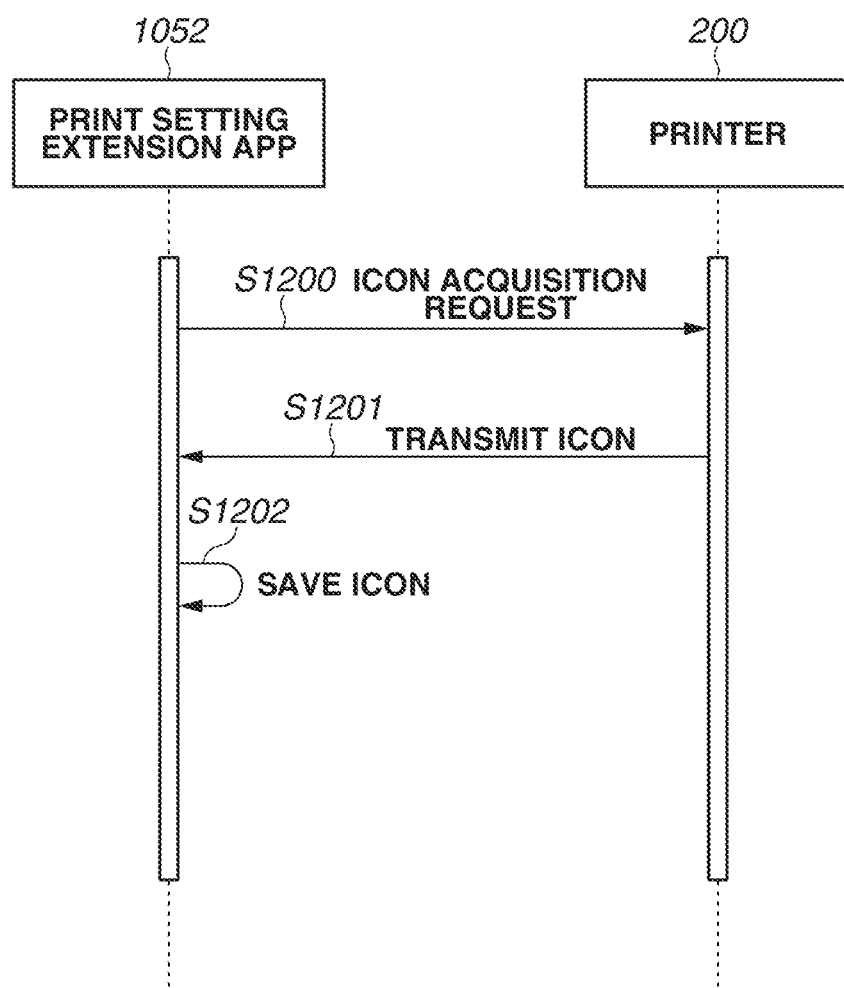
FIG. 12 is a sequence diagram illustrating a process in which a print setting extension application (app) acquires an icon from the printer.
Figure 16:
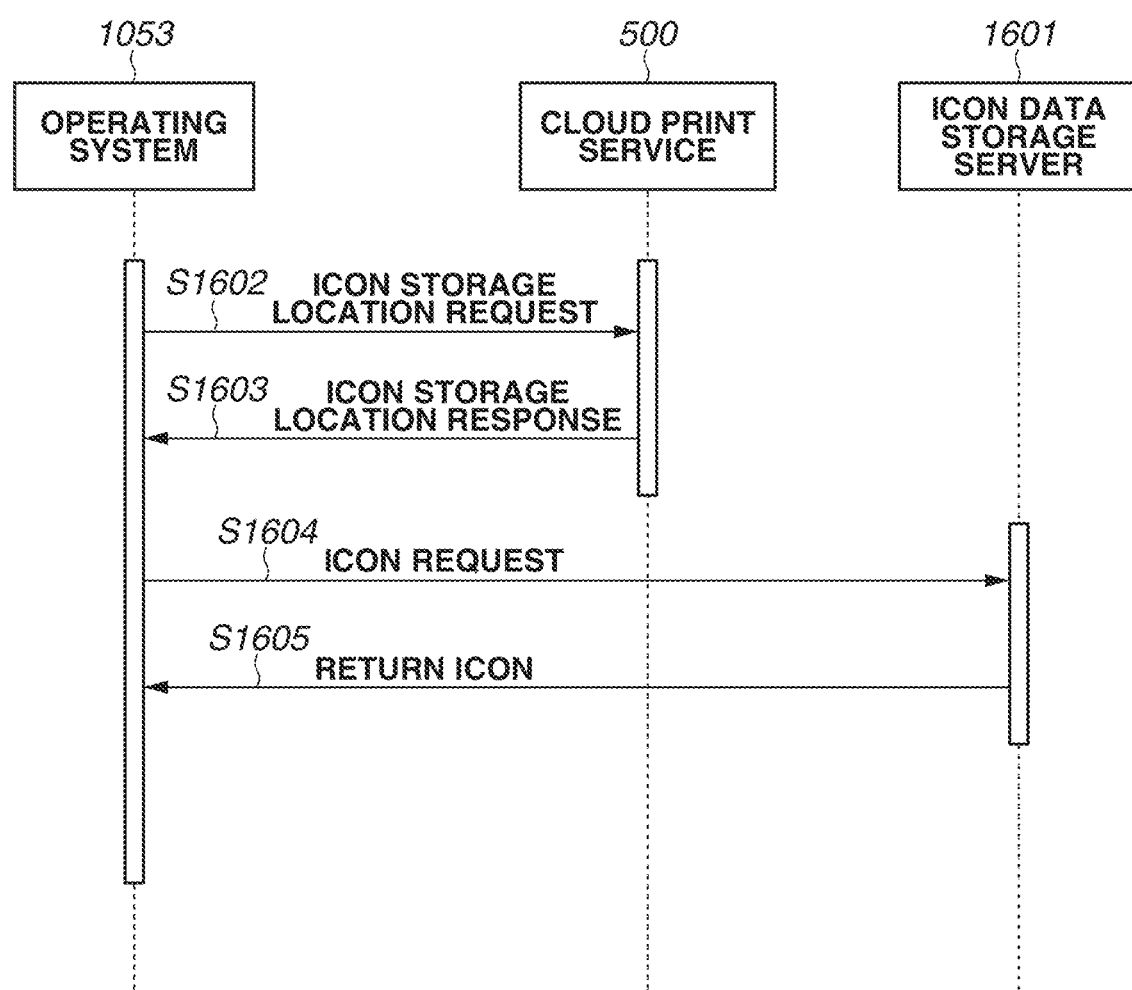
FIG. 16 is a sequence diagram illustrating a process in which a cloud print service acquires an icon based on an icon request from an operating system.

Instead of step S819, as illustrated in a sequence diagram in FIG. 12, the print setting extension app 1052 may acquire an icon from the printer 200. Alternatively, the print setting extension app 1052 may acquire an icon suitable for the printer determined in step S802 from among a plurality of icons included in advance in the print setting extension app 1052. In step S1200, the print setting extension app 1052 makes an icon request to the printer 200. Then, in step S1201, the printer 200 returns an icon saved in the printer information storage unit 229 to the request source. In step S1202, the print setting extension app 1052 having received the returned icon saves the icon. The print setting extension app 1052 may associate the icon with the print queue. Alternatively, as illustrated in FIG. 16, the print setting extension app 1052 may acquire, from the printer 200, access information regarding access (link) to a server that stores icons, access the server based on the link, and acquire the icon from the server.

Figure 13:
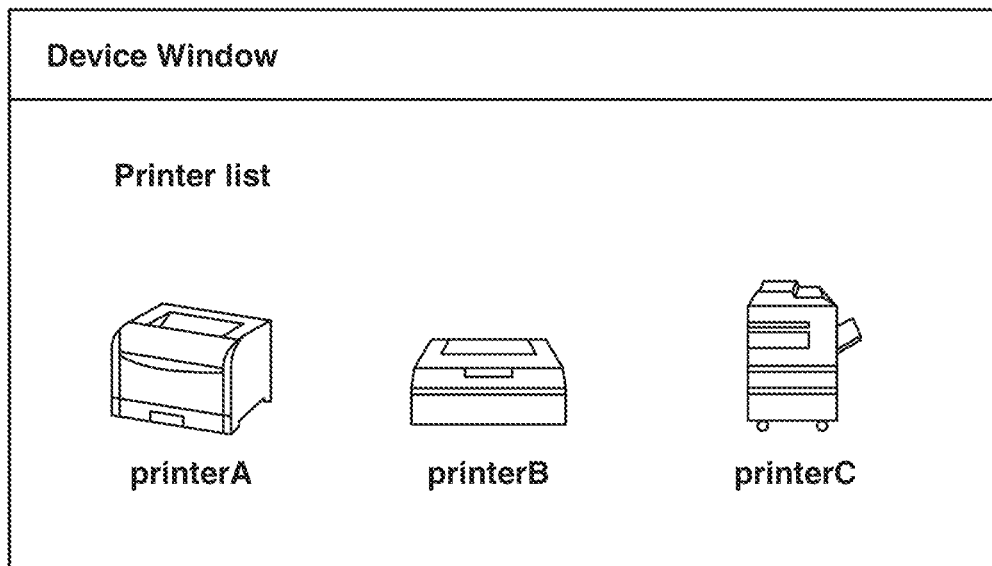
FIG. 13 is an example of display of icons on the client computer.
Figure 14:
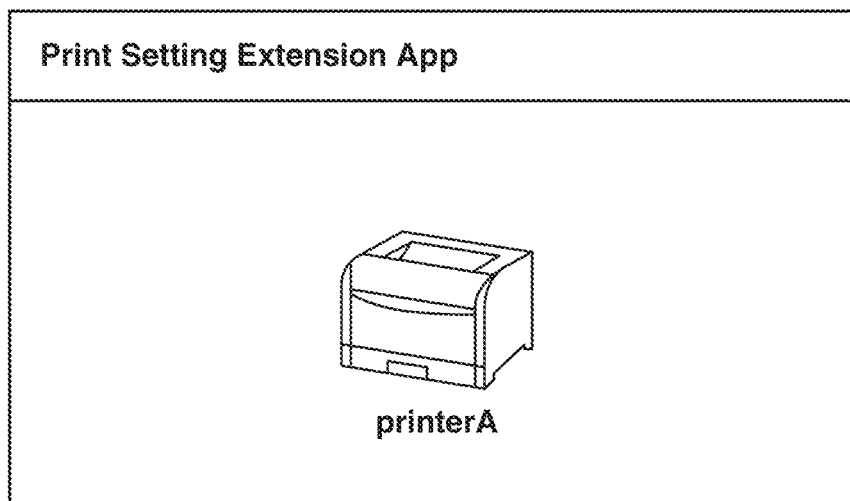
FIG. 14 is an example of display of an icon by the print setting extension app.

For example, the icon acquired in FIG. 8 is displayed on a screen system that displays a list of peripheral devices of the operating system 1053 (i.e., a printer management screen for managing devices such as printers) as illustrated in FIG. 13 by the operating system 1053. In the print setting extension app 1052 installed in association with the printer driver 1056 when the printer driver 1056 is installed, an icon corresponding to the print setting extension app 1052 may be pressed on a screen that displays a list of applications 1051 installed on the client computer 100. Then, on a screen of the print setting extension app 1052 opened by pressing the icon, the pressed icon may be displayed (FIG. 14).

By the above procedure, it is possible to acquire an icon also for a printer on the cloud print service 500. Based on the icon displayed on the screen that displays a list of peripheral devices of the operating system 1053 (FIG. 13) or the screen of the print setting extension app 1052 (FIG. 14), the user can easily identify a printer to which the user is connected.

In the first exemplary embodiment, the cloud print service 500 can acquire an icon from the printer 200 or the cloud print-compatible printer 201, and the operating system 1053 or the print setting extension app 1052 can acquire the icon and display the icon on a screen. However, in a case where the cloud print-incompatible printer 202 is being used in the cloud print service 500, the cloud print-incompatible printer 202 is connected to the cloud print service 500 via the cloud print proxy server 300, and therefore, the method according to the first exemplary embodiment cannot be achieved.

Thus, in a second exemplary embodiment, with reference to FIG. 6, a description is given of a method for acquiring an icon even from the cloud print-incompatible printer 202 in a case where the cloud print service 500 is being used.

In step S600 in FIG. 6, this flow starts when the cloud print service 500 receives a registration operation performed by the user of the cloud print-incompatible printer 202, using the cloud print proxy 1054. Then, in step S601, if it is determined that the registered printer is not directly connected to the cloud print service 500 (NO in step S601), the processing proceeds to step S603. In step S603, the cloud print service 500 makes an icon acquisition request to the cloud print proxy server 300. The following flow is similar to that in the first exemplary embodiment, and therefore is not described.

Figure 15:
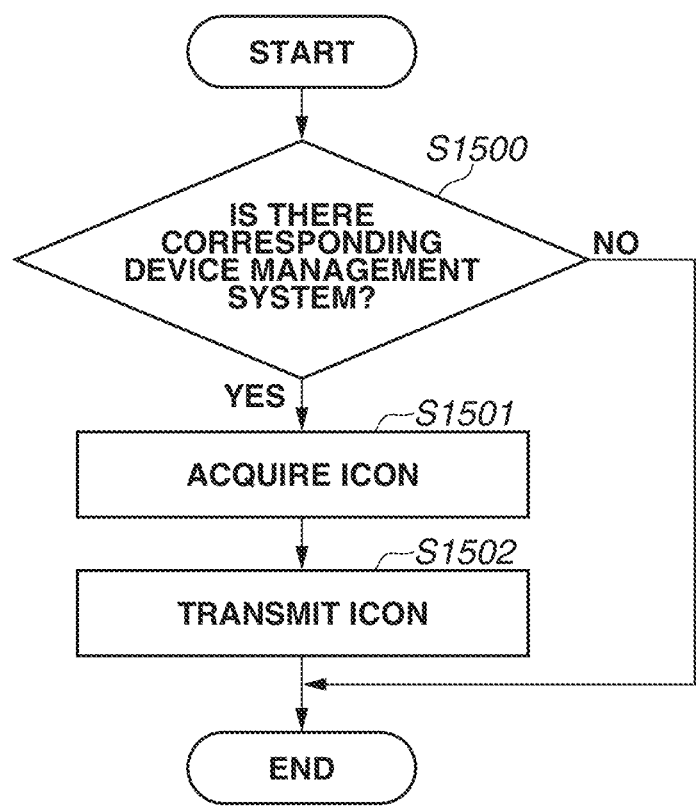
FIG. 15 is a flowchart illustrating an icon acquisition process performed by a cloud print proxy server.

FIG. 15 is a flowchart illustrating a process in which the cloud print proxy server 300 having received the icon acquisition request in step S603 in FIG. 6 acquires and returns an icon of the cloud print-incompatible printer 202.

This flowchart starts when the cloud print proxy server 300 receives the icon request from the cloud print service 500 and determines whether the icon of the requested printer is present in the device management system 1055.

For example, as the device management system 1055, Device Stage by Microsoft Corporation is assumed. More specifically, Device Stage is a mechanism for extending functions in various peripheral devices and is started by the device management system 1055 built in the operating system 1053. The device management system 1055 detects that a peripheral device is selected by the user. Then, the device management system 1055 automatically downloads necessary control software (driver) and an application for extending functions, from a server on the Internet (the printer driver distribution service 600 in the present exemplary embodiment) in advance. In the present exemplary embodiment, the icon of the corresponding printer is also stored on the server.

In step S1500, if a device management system 1055 corresponding to the requested printer is present in the cloud print proxy server 300 (YES in step S1500), the processing proceeds to step S1501. In step S1501, the cloud print proxy server 300 acquires an icon present in the main storage device 102 or the auxiliary storage device 105. Then, in step S1502, the cloud print proxy server 300 transmits the icon acquired in step S1501 to the cloud print service 500 as the request source. In step S1500, if a device management system 1055 corresponding to the requested printer is not present (NO in step S1500), the cloud print proxy server 300 transmits, to the request source, information indicating that the acquisition of an icon is failed.

By the above procedure, it is possible to acquire an icon also for the cloud print-incompatible printer 202 on the cloud print service 500. Based on the icon of the printer displayed on the screen that displays a list of peripheral devices of the operating system 1053 (FIG. 13) or the screen of the print setting extension app 1052 (FIG. 14), the user can easily identify a printer to which the user is connected.

Next, a third exemplary embodiment is described. FIG. 16 is a sequence diagram illustrating a process in which the operating system 1053 acquires an icon in a case where the cloud print service 500 manages not icon data but the location (URL) where the icon data is stored.

In step S1602, the operating system 1053 transmits an icon storage location request together with an HWID to the cloud print service 500. In step S1603, the cloud print service 500 acquires the storage location (URL) of an icon corresponding to the transmitted HWID from the printer database 510 and transmits the storage location as an icon storage location response to the operating system 1053. In step S1604, the operating system 1053 transmits an icon request to an icon data storage server 1601 indicated by the storage location (URL) of the icon transmitted in step S1603. In step S1605, the icon data storage server 1601 transmits icon data to the operating system 1053.

In the first and second exemplary embodiments, a description has been given of a method for acquiring an icon in the flow in which a driver of a printer selected after a printer is searched for is installed as illustrated in FIG. 8.

In a fourth exemplary embodiment, a description is given of a method for acquiring an icon when the print setting extension app 1052 is started.

FIG. 17 is a flowchart illustrating a process of acquiring an icon when the print setting extension app 1052 is started by the user. This flowchart starts when the user starts the print setting extension app 1052.

In step S1700, the print setting extension app 1052 having received a start instruction acquires a list of printers associated with the print setting extension app 1052. There is a possibility that the print setting extension app 1052 is associated with all printers described in a driver extension package. Thus, in step S1701, the print setting extension app 1052 needs to check whether there is an icon associated with each printer in the list of printers acquired in step S1700. The print setting extension app 1052 checks whether the corresponding printers and icons are associated with each other. If there is a printer with which an icon is not associated (NO in step S1701), the processing proceeds to step S1702. The acquisition of an icon in step S1702 is performed based on the flow of processing illustrated in a sequence diagram in FIG. 18. At this time, in step S1800, the print setting extension app 1052 instructs the operating system 1053 to make an icon request. Steps S1801 to S1805 are similar to steps S1100 to S1104 described in FIG. 11 as an example of step S809 in FIG. 8, and therefore are not described. In step S1806, the operating system 1053 passes the icon received in step S1804 to the print setting extension app 1052.

FIG. 18 is a sequence diagram illustrating a case where the print setting extension app 1052 instructs the operating system 1053 to acquire an icon. On the other hand, it is also possible that as illustrated in FIG. 19, the print setting extension app 1052 directly makes an icon request to the cloud print service 500 not via the operating system 1053.

In this case, in step S1900, the print setting extension app 1052 makes an icon request to the cloud print service 500. Steps S1901 and S1902 are similar to steps S1101 and S1102 in FIG. 11, and therefore are not described. Next, in step S1903, the cloud print service 500 passes the acquired icon to the print setting extension app 1052.

In step S1904, the print setting extension app 1052 saves the icon received in step S1903 in association with the corresponding printer. In step S1905, the print setting extension app 1052 passes the icon received in step S1903 to the operating system 1053. In step S1906, the operating system 1053 saves the received icon in association with the corresponding printer queue. In either of FIGS. 18 and 19, the print setting extension app 1052 may request an icon from the cloud print server as described above. Alternatively, as described in the third exemplary embodiment, after requesting URL information indicating the storage location of the icon, the print setting extension app 1052 may make an icon acquisition request to a URL indicated by the URL information. Alternatively, the print setting extension app 1052 may hold URL information regarding the URL where the icon is stored in advance. Then, using HWID of a printer to which the print setting extension app 1052 is connected as a query parameter, the print setting extension app 1052 may transmit an icon request to the URL where the icon is stored, and receive the corresponding icon.

In step S1703, if the reception of the icon requested in step S1702 is failed (NO in step S1703), the processing proceeds to step S1704. In step S1704, based on information acquired at this time by a procedure (not illustrated), such as HWID or a marker type, the print setting extension app 1052 may determine an attribute of the corresponding printer, such as whether the printer is a personal printer or an office printer. Then, based on the determined attribute, the print setting extension app 1052 may save a default icon in association with the determined attribute. In step S1703, if the reception of the icon requested in step S1702 is successful (YES in step S1703), the print setting extension app 1052 saves the icon in association with the corresponding device, and the processing proceeds to step S1705. In step S1705, the print setting extension app 1052 displays a UI started after the association between all the printers associated with the started print setting extension app 1052 and the icons is completed. As a part of the display content of the UI, the icons saved in steps S1702 and S1704 may be displayed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While the present disclosure includes exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Applications No. 2020-201255, filed Dec. 3, 2020, No. 2021-108999, filed Jun. 30, 2021, and No. 2021-145183, filed Sep. 7, 2021, which are hereby incorporated by reference herein in their entirety.

What is claimed is:

1. A non-transitory storage medium storing an application that provides a print setting screen for allowing a user to set a print setting used to generate a print command provided for printing in a printer of which an identifier is stored in association with a predetermined driver in a computer, wherein the application, when executed by the computer, causes the computer to:
    acquire data of an image representing the printer from an external apparatus different from the computer via a network, wherein the data is acquired based on a link that the computer has received from a print server system that exists between the printer and the computer and transmits the print command directed to the printer; and
    display the image based on the acquired data on a display unit of the computer.

2. The non-transitory storage medium according to claim 1, wherein the predetermined driver is a standard driver provided as a function of an operating system.

3. The non-transitory storage medium according to claim 2, wherein the standard driver is a driver compatible with printers of a plurality of models of a plurality of vendors.

4. The non-transitory storage medium according to claim 1, wherein the link is a link sent using an attribute "printer-static-resource-directory-uri" in Internet Printing Protocol.

5. The non-transitory storage medium according to claim 1, wherein the link is transmitted to the printer by the print server system.

6. The non-transitory storage medium according to claim 5, wherein the data of the image is uploaded by the printer to a storage designated by the link that has been received from the print server system.

7. The non-transitory storage medium according to claim 1, wherein the predetermined printer driver is able to generate the print command that complies with Internet Printing Protocol.

8. A computer on which an application is installed that provides a print setting screen for allowing a user to set a print setting used to generate a print command provided for printing in a printer of which an identifier is stored in association with a predetermined driver in the computer, wherein the application, when executed by the computer, causes the computer to perform operations comprising:
   acquiring data of an image representing the printer from an external apparatus different from the computer via a network, wherein the data is acquired based on a link that the computer has received from a print server system that exists between the printer and the computer and transmits the print command directed to the printer; and
   displaying the image based on the acquired data on a display unit of the computer.

9. The computer according to claim 8, wherein the predetermined driver is a standard driver provided as a function of an operating system.

10. The computer according to claim 9, wherein the standard driver is a driver compatible with printers of a plurality of models of a plurality of vendors.

11. The computer according to claim 8, wherein the link is a link sent using an attribute "printer-static-resource-directory-uri" in Internet Printing Protocol.

12. The computer according to claim 8, wherein the link is transmitted to the printer by the print server system.

13. The computer according to claim 12, wherein the data of the image is uploaded by the printer to a storage designated by the link that has been received from the print server system.

14. The computer according to claim 8, wherein the predetermined printer driver is able to generate the print command that complies with Internet Printing Protocol.

15. A method executed by a computer executing an application that provides a print setting screen for allowing a user to set a print setting used to generate a print command provided for printing in a printer of which an identifier is stored in association with a predetermined driver in the computer, the method comprising:
   acquiring data of an image representing the printer from an external apparatus different from the computer via a network, wherein the data is acquired based on a link that the computer has received from a print server system that exists between the printer and the computer and transmits the print command directed to the printer; and
   displaying the image based on the acquired data on a display unit of the computer.

16. The method according to claim 15, wherein the predetermined driver is a standard driver provided as a function of an operating system.

17. The method according to claim 16, wherein the standard driver is a driver compatible with printers of a plurality of models of a plurality of vendors.

18. The method according to claim 15, wherein the link is a link sent using an attribute "printer-static-resource-directory-uri" in Internet Printing Protocol.

19. The method according to claim 15, wherein the link is transmitted to the printer by the print server system.

20. The method according to claim 19, wherein the data of the image is uploaded by the printer to a storage designated by the link that has been received from the print server system.

21. The method according to claim 15, wherein the predetermined printer driver is able to generate the print command that complied with Internet Printing Protocol.

* * * * *